United States Patent [19]

Lodetti et al.

[11] Patent Number: 4,749,838

[45] Date of Patent: * Jun. 7, 1988

[54] SPARK EROSION MACHINE WITH A FIXED MACHINE TABLE, REMOVABLE TABLE PLATE, AND LOWERABLE WORKING CONTAINER FOR THE DIELECTRIC

[75] Inventors: Attilio Lodetti; Hansueli Blaser, both of Losone, Switzerland

[73] Assignee: AG fur industrielle Elektronik AGIE, Losone, Switzerland

[*] Notice: The portion of the term of this patent subsequent to Dec. 15, 2004 has been disclaimed.

[21] Appl. No.: 809,986

[22] Filed: Dec. 17, 1985

[30] Foreign Application Priority Data

Dec. 21, 1984 [DE] Fed. Rep. of Germany ....... 3446988

[51] Int. Cl.⁴ .............................................. B23H 7/00
[52] U.S. Cl. ............................. 219/69 R; 204/224 M; 219/69 D
[58] Field of Search ............................ 219/69 D, 69 R; 204/W38206, 224 M, 297 R

[56] References Cited

U.S. PATENT DOCUMENTS

| | | | |
|---|---|---|---|
| 3,541,291 | 11/1970 | Johanson | 219/69 G |
| 3,542,993 | 11/1970 | Buck | 204/129.5 |
| 3,825,245 | 7/1974 | Osburn et al. | 198/465.1 |
| 4,423,806 | 1/1984 | Ogasawara | 198/465.1 |
| 4,534,546 | 8/1985 | Cattani | 269/309 |

FOREIGN PATENT DOCUMENTS

| | | | |
|---|---|---|---|
| 0123792 | 11/1984 | European Pat. Off. | |
| 1565371 | 7/1971 | Fed. Rep. of Germany | 219/69 R |
| 2320370 | 10/1973 | Fed. Rep. of Germany | |
| 2257138 | 3/1974 | Fed. Rep. of Germany | |
| 2514899 | 10/1976 | Fed. Rep. of Germany | 219/69 D |
| 2811299 | 9/1979 | Fed. Rep. of Germany | 219/69 R |
| 3213013 | 10/1983 | Fed. Rep. of Germany | 219/69 D |
| 3303758 | 8/1984 | Fed. Rep. of Germany | 219/69 D |
| 0093231 | 5/1984 | Japan | 219/69 D |
| 0169726 | 9/1984 | Japan | 219/69 D |
| 0232723 | 12/1984 | Japan | 219/69 D |

OTHER PUBLICATIONS

"Technische Presseinformation", Dec. 1983, 1 page, by Schiess-AG.
"Anlage A16", 1984, 1 page, by Schiess-AG.
"VID-Zeitschrift" 123/19 (I) (Oct. 1981) pp. 815-818.
"VID-Zeitschrift" 119/6 (II) (Mar. 1977) pp. 4-7.
"Fertigung" 5/77 pp. 117-124.
"Werkstatt und Betrieb" 115/6 (1982) p. 411.
"Machine+Werkzeug" 19/1984 p. 6.
"American Machinist", Mar. 1984, pp. 113 and 124.
German Industrial Standard DIN 55 201 (see figures) Jun., 1983.
42/"Fertigung" 5/77 pp. 117-124.

*Primary Examiner*—G. P. Tolin
*Assistant Examiner*—Geoffrey S. Evans
*Attorney, Agent, or Firm*—Neuman, William, Anderson & Olson

[57] ABSTRACT

A spark erosion machine having a machine table fixed to the machine upright and on which can be arranged a working container for the dielectric fluid by joining a vertically movable, cross-sectionally C-shaped component to an L-shaped component in longitudinal section. The L-shaped component comprises a fixed vertical wall element forming the rear wall of the working container and the machine table plate, which is detachably connected to the fixed wall element through a seal. The machine table plate is fixable in the reference plane of the machine table by means of rapid fastening and centering devices.

12 Claims, 3 Drawing Sheets

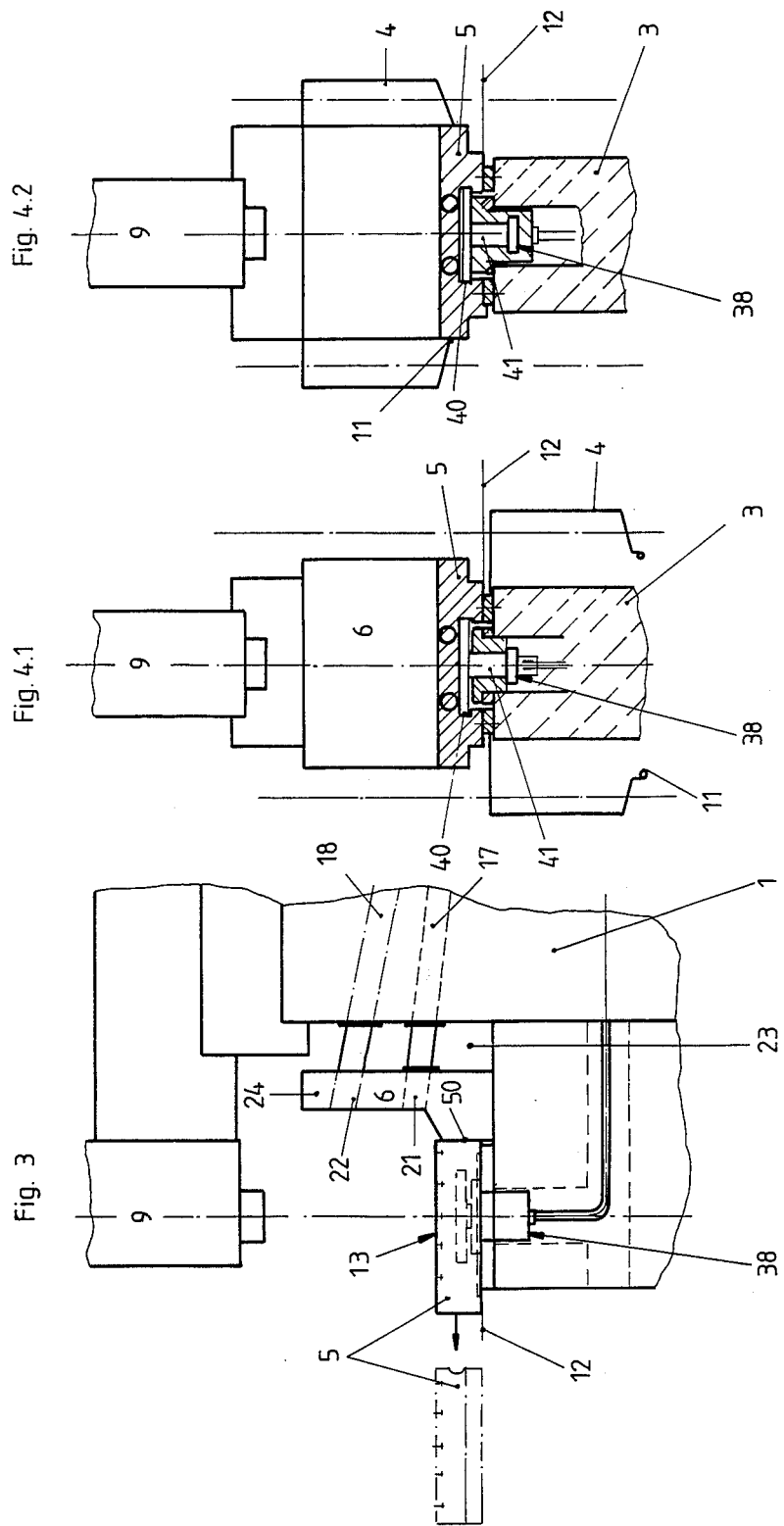

SPARK EROSION MACHINE WITH A FIXED MACHINE TABLE, REMOVABLE TABLE PLATE, AND LOWERABLE WORKING CONTAINER FOR THE DIELECTRIC

BACKGROUND OF THE INVENTION

The present invention relates to a spark erosion machine having a fixed machine table and a working container for the dielectric working fluid formed of at least one movable component and a fixed wall element. Further, at least a portion of the bottom of the working container is formed by the machine table plate. The rear wall of the working container essentially comprises the fixed wall element. Such a spark erosion machine is described in the U.S. application Ser. No. 805,152 of the present applicants, filed on Dec. 4, 1985.

In a spark erosion machine as described in the aforementioned application, the fixed wall element forming the rear wall of the working container is preferably spatially separated from the machine upright and is constructed in one piece with the machine table plate so as to form an L-shaped fixed component. The movable component of the working container essentially comprises a frame having a generally C-shaped crosssection in the horizontal plane, which frame complements the fixed L-shaped component to form the working container when the fixed and movable components are joined. This C-shaped frame is vertically movable on vertical guides arranged on the machine upright, so that the upper edge of the movable component can be lowered beneath the machine table plate. Such a spark erosion machine provides the advantages of easy accessibility to the machine table or clamping plate after lowering the movable working container walls, i.e., the C-shaped frame, and a high stability of the spark erosion machine, which is a prerequisite for high working accuracy. The machine table can be directly connected to the machine upright, which allows the possibility of a large area of connection between the machine table and the machine upright, as well as a short, closed force path. The distance provided between the fixed wall element forming the rear wall of the working container and the end face of the machine upright also has the advantage of providing substantial thermal insulation of the machine upright from the working container. This considerably reduces the risk of thermal stresses in the machine upright, which again contributes to an increase in working accuracy. The construction of the C-shaped frame and its ability to be lowered, linked with the free accessibility of the machine table plate, lead to a shortening of the working time required for assembling and disassembling the machine table plate (i.e., positioning the workpiece, as well as clamping and unclamping, while maintaining high precision tolerances, because once again the production accuracy is dependent on this). To avoid unnecessary repetition of the subject matter of the aforementioned application, reference is made thereto and its description is consequently made part of the subject matter of the present description.

SUMMARY OF THE INVENTION

On the basis of this technical background, the present invention aims at further reducing the necessary working time involved in the assembly and disassembly of the machine table plate, for increasing the utilization and consequently the productivity of the machine. Simultaneously, the advantages of the spark erosion machine described in the aforementioned application are maintained to the greatest possible extent.

For this purpose, in the present spark erosion machine, the machine table plate is operationally detachably connected both to the machine table and to the fixed wall element and includes a seal or packing at its interface with the fixed wall element. According to the present invention, the fixed wall element can also form a portion of the actual front wall of the machine upright.

The interchangeability of the machine table plate resulting from the present invention has the advantage that the assembly and disassembly of the machine table plate can be carried out during the time in which the spark erosion machine is machining another workpiece on another machine table plate. The parallel assembly and disassembly of another machine table during the machining of a workpiece in the spark erosion machine is referred to hereinafter as "parallel equipping". The use of several interchangeable machine table plates for the same spark erosion machine is referred to hereinafter as "palletizing".

According to a preferred embodiment of the invention, between the front wall of the machine upright and the fixed wall element, i.e., the rear wall of the working container, a space is provided. This leads to the same advantages as achieved in connection with the spark erosion machine described in the aforementioned application. According to another preferred embodiment, the seal or packing provided between the machine table plate, also called the pallet, and the fixed wall element is constructed as a static seal or packing, particularly as an inflatable seal or packing. As is known, an inflatable seal can be brought into the sealing state by inflating the seal using a fluid, e.g. air or liquid. Fundamentally, the inflatable seal can be arranged in the interchangeable machine table plate and/or in the fixed wall element. However, it is preferably arranged in the fixed wall element.

The machine table plate can be changed particularly rapidly if the bottom of the table plate is designed for engagement with rapid fastening and centering devices arranged in the machine table. Preferably, the centering device includes two vertical centering mandrels arranged in a spaced manner on the machine table for fixing the machine table plate on the reference plane of the machine table. The rapid fastening device has a substantially T-shaped, verticallY guided lifting cylinder, whose horizontal leg engages an undercut groove that is centrally positioned on the bottom of the machine table plate and runs from the front to the rear of the table plate. This construction permits a rapid interchangeability of the machine table plates, while preserving a high centering precision. It is then fundamentally possible to perform successive machining operations by using different machine workpieces fixed to a pallet or a machine table plate, e.g., in a spark erosion machine and, before or after it, a milling machine.

In the present invention, the detached machine table plate can be manually drawn off from the front by means of an auxiliary device and, by means of corresponding, further auxiliary devices, can be transferred to an assembly station for clamping or unclamping the workpiece, as well as for allowing for the exact alignment thereof, and returned to the spark erosion machine. Great significance is attached in this connection to an automatically functioning raisable, lowerable and rotary table plate changing mechanism or robot which is able to take up and transfer the machine table plates (pallets) by means of two support struts. For this purpose the end face of the machine table plate is provided with two bores, preferably arranged symmetrically, for receiving two support struts of the automatically working table plate change mechanism (robot). The robot is then in a position to directly raise the pallets from the machine table without using further auxiliary means, transport them to the assembly and disassembly station, and, subsequently, back to the spark erosion machine.

Preferably, the machine table plate projects forwards and sidewards over the machine table, which prevents any risk of contamination by dripping liquid, eroded material and the like to the rapid fastening and centering means arranged centrally below the machine table plate. This obviates the need to clean the rapid fastening and centering means before each pallet change in order to ensure the necessary positioning accuracy of the workpiece.

In the spark erosion machine according to the invention, liquid supply and drain lines are preferably connected to the fixed wall element, as in the case of the spark erosion machine described in the aforementioned application. This has the advantage that, on changing a pallet, the supply and drain lines do not also need to be detached and then connected again.

BRIEF DESCRIPTION OF THE DRAWINGS

The invention is described in greater detail hereinafter by reference to illustrative embodiments and the attached drawings, which show:

FIG. 3 A detail of the side view of an embodiment of a spark erosion machine according to the present invention with an interchangeable machine table plate (pallet).

FIG. 4.1 A detail from an embodiment of a spark erosion machine and according to to the present invention with a machine FIG. 4.2 table plate (pallet), a lowered working container and a detached rapid fastening device (FIG. 4.1), and the same view with a raised working container and the rapid fastening device in the working position (FIG. 4.2).

DETAILED DESCRIPTION OF THE PREFERRED EMBODIMENTS

Figure 1:
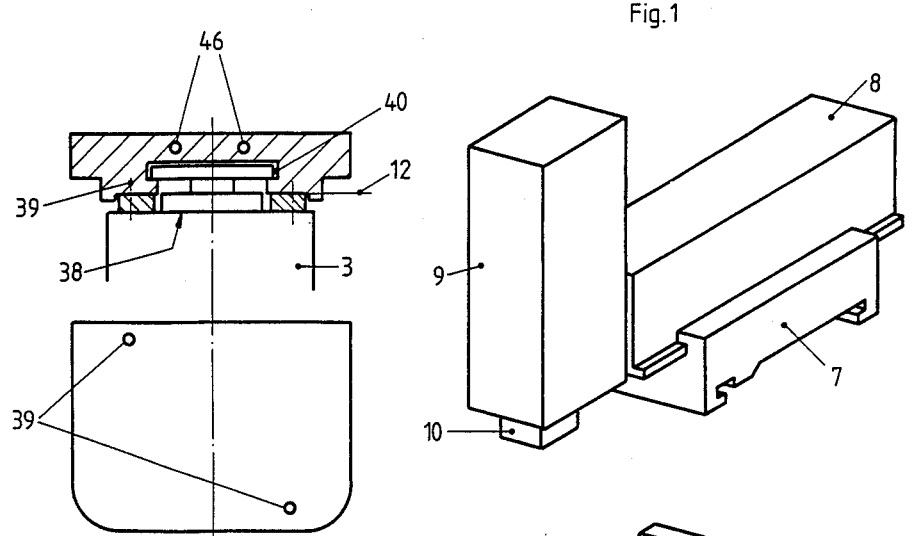
FIG. 1 A perspective view of a spark erosion machine incorporating a first embodiment of the present invention, partly broken down into functional groups.

The embodiment shown in FIG. 1 is the same as the spark erosion machine described in the aforementioned copending patent application of applicants, except that the machine table plate 5 is a removable component and thus is operationally detachably connected to the machine table 3 and the fixed wall element 6 which forms the rear wall of the working container. Between the fixed wall element 6 and the machine table plate 5 is arranged an inflatable seal or packing 50.

The spark erosion machine also comprises a machine upright 1 with an intermediate slide 7 and a cross member 8, on the front of which is located a machine head 9 with an extendable and retractable spindle sleeve 10.

On the front of the machine upright is constructed a stable machine table 3. Two pipes 17, 18 for the working container pass centrally through the machine upright 1 and allow for smoke exhaust and the supply or drain of dielectric fluid. In the reference plane 12 of the machine table 3 and projecting forwards and sidewards over the same is located the interchangeable machine table plate 5, also called a pallet. It is detachably connected by means of the inflating seal 50 to the fixed wall element 6 which is positioned vertically with respect to the machine table plate and parallel to the end face of the machine upright in spaced manner. The machine table plate 5 and the fixed wall element 6, which forms the rear wall of the working container, together form an L-shaped component 13.

A movable one-piece component 4 is fixed to the front wall of machine upright 1 on two vertical guides 2 which are symmetrically positioned on either side of the machine table. In its raised position, the movable component 4 joins with the L-shaped component 13 through a perimetrical, statically operating (e.g. air-operated) inflatable seal 11, to form the working container for the dielectric fluid. The movable component 4 has a substantially C-shaped cross-section in the horizontal plane and comprises a vertical front wall 19 and two side walls 20.

The fixed wall element 6 of the component 13 contains in its upper part an outlet 22 for smoke exhaustion, and its lower part has an outlet 21 for the dielectric fluid. The two outlets 21, 22 are fixed to corresponding pipes 17, 18 in the machine upright 1. In addition, the fixed wall element 6 may also be constructed as a casing block 24 for receiving all the operationally necessary supply and disposal apparatus for the working container. The spacing 23 between the end wall of the machine upright and the fixed wall element 6 is used as an air cushion for thermal insulation between the working container and machine upright 1. Further explanation of the general construction of this spark erosion machine is found in the aforementioned prior patent application.

Figure 2:
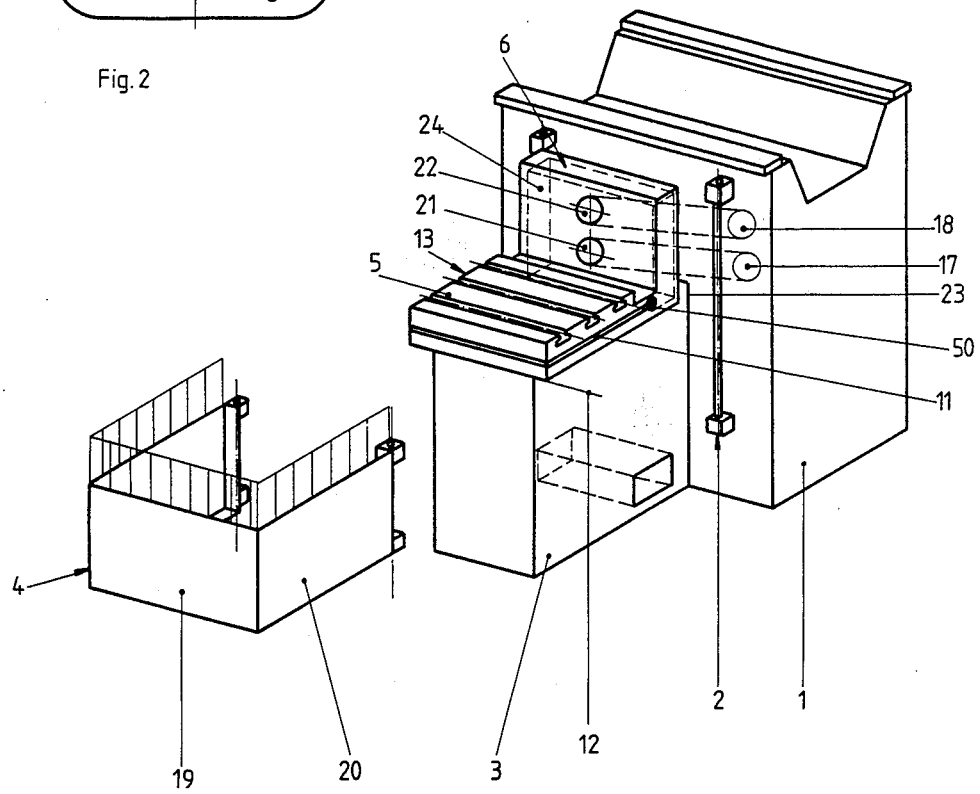
FIG. 2 An embodiment of a machine table plate in section and in elevation with rapid fastening and centering apparatus.

FIG. 3 is a detail of a side view of an embodiment of the spark erosion machine according to the present invention, which mainly differs from the machine described in the prior application through its interchangeable machine table plate 5 and attendant inflating seal 50 and the rapid fastening device 38. The latter is used for fixing the machine table plate 5 in the reference plane on machine table 3. It is also provided with two displaced and vertically arranged centering mandrels 39 for centering the machine table plate 5 (FIG. 2).

FIGS. 4.1 and 4.2 represent a detail of an embodiment in front elevation, FIG. 4.1 illustrating a lowered, movable component 4 and detached rapid fastening device 38, and FIG. 4.2 illustrating a raised, movable component 4 and tightened rapid fastening device 38. The rapid fastening device 38 comprises a substantially T-shaped, fluidically elevating cylinder 41 guided vertically in machine table 3. The horizontal leg of the cylinder is horizontally guided in the undercut part of a groove 40, which is in turn arranged centrally on the bottom of machine table plate 5 and runs from the front to the rear thereof.

Figure 5:
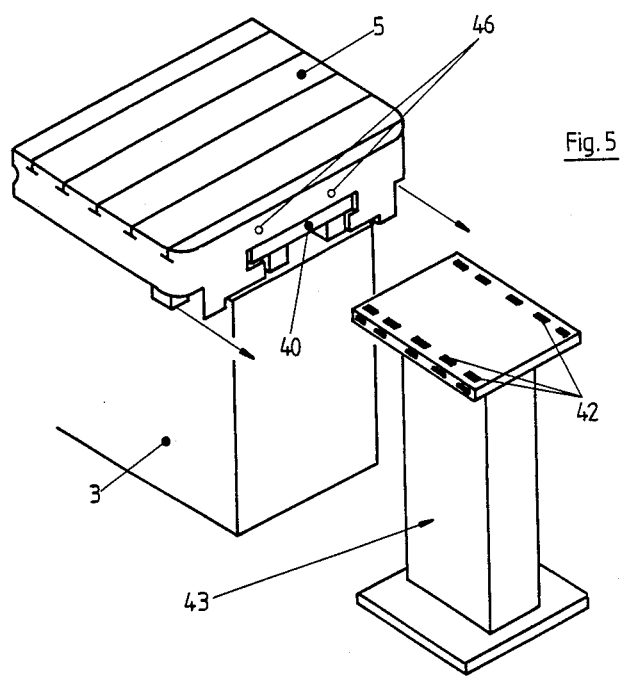
FIG. 5 A detached machine table plate mounted on the machine table with a previously displaced auxiliary device at the time of displacing the machine table plate.
Figure 6:
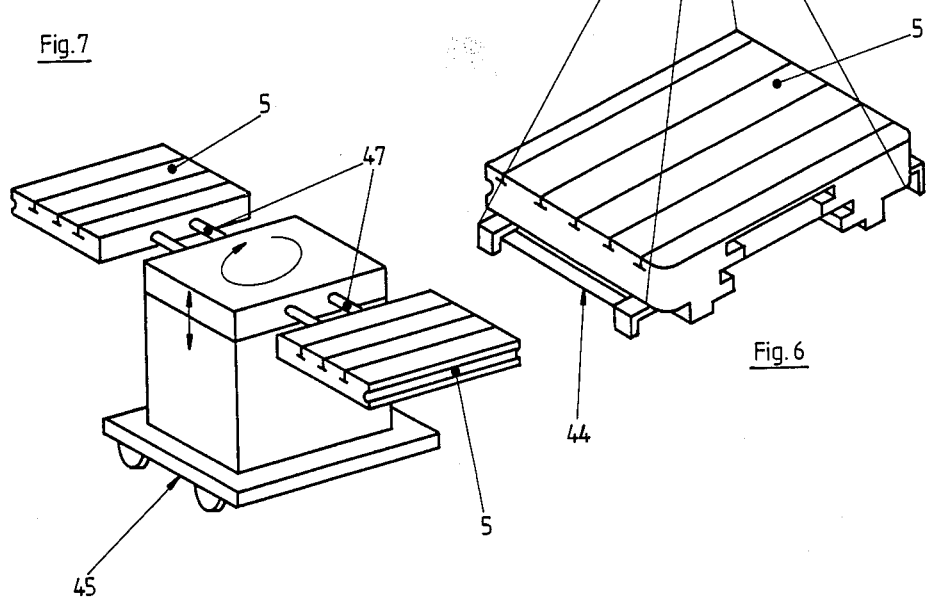
FIG. 6 Apparatus for raising and transporting the machine table plate.

The actual replacement of the machine table plate 5 can only take place when it has been detached from the centered position by the T-shaped elevating cylinder 41 and has been raised away by means of the centering mandrels 39. Only then and as shown in FIG. 5, can the pallet or machine table plate 5 be drawn off forwards manually or by means of an auxiliary device and drawn onto a column-like further auxiliary device 43, which is constructed correspondingly at the top and is provided with rollers 42. Using suitable loading equipment 44 as shown in FIG. 6, the machine table plate 5 can be raised from there on a crane hook and transferred to an assembly station (not shown).

Figure 7:
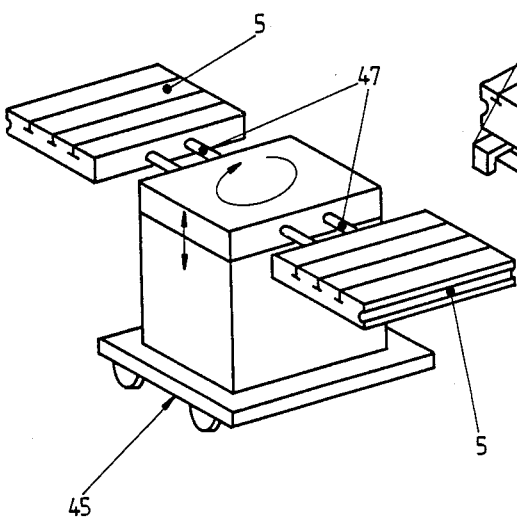
FIG. 7 An automatically functioning raisable, lowerable and rotary machine table plate change mechanism (robot) with two machine table plates (pallets) suspended on its support struts.

The raising or removal of machine table plate 5 directly from machine table 3 can also take place by means of an automatically functioning raisable, lowerable and rotary pallet changing mechanism, namely a robot 45. For this purpose there are symmetrically arranged bores 46 in the end face of machine table plate 5 which are able to receive the support struts 47 of robot 45 (FIG. 7). Further auxiliary and conveying means are not required in this case.

What is claimed is:

1. A spark erosion machine including a machine upright, a fixed machine table, a machine table plate, and a working container for holding the dielectric fluid during a machining operation, wherein the machine table includes a substantially vertically wall element fixed thereto; the machine table plate is detachably connected to the machine table and is disposed adjacent to said vertical wall element and controllably sealable to said wall element; and the working container for the dielectric fluid is formed on the machine table by a movable component and a fixed component, where said fixed component comprises the machine table plate which forms at least a portion of the bottom of the working container and the vertical wall element which forms at least a portion of the rear wall of the working container, the movable component being movable from a working position in which it is sealingly mated with the fixed component to a position away from the machine table plate to allow access thereto.

2. A spark erosion machine comprising a machine upright portion, a machine table portion fixed with respect to the machine upright portion and having a top surface defining a reference plane, a vertically extending wall element fixed with respect to the rear of the machine table portion, a machine table plate removably attached to the machine table portion on said reference plane, means for fastening and centering the machine table palte on the machine table portion, and a working container for dielectric fluid having a bottom formed at least in part by said machine table plate, a rear formed at least in part by said fixed wall element, and a movable portion that is adapted to mate in a sealing manner with the machine table plate and the fixed wall element during a machining operation and may be selectively moved away from said machining table plate to provide free access thereto, the means for fastening and centering the machine table plate on the machine table portion being located outside of the working container when the movable portion of the working container is mated with the machine table plate and the fixed wall element.

3. A spark erosion machine according to claim 2 wherein said fixed wall element is spaced from the machine upright portion.

4. A spark erosion machine according to claim 2 further comprising inflatable seal means for controllably sealing the interface between the machine table plate and the fixed wall element.

5. A spark erosion machine according to claim 2 wherein said fastening and centering means includes at least two centering mandrels arranged in displaced manner on the machine table portion for centering the machine table plate in said reference plane.

6. A spark erosion machine according to claim 2 wherein said machine table plate has formed in its bottom an undercut groove and said fastening and centering means includes a selectively operable means for engaging said undercut groove formed in the machine table plate to fasten the table plate in said reference plane.

7. A spark erosion machine according to claim 6 wherein said engagement means comprises a substantially T-shaped, vertically guided elevating cylinder, and the horizontal leg of the elevating cylinder is adapted for engagement with the undercut groove in the machine table plate.

8. A spark erosion machine according to claim 2 wherein the machine table palte includes means for receiving support means for removing the table plate from the machine upright portion.

9. A spark erosion machine according to claim 8 wherein said receiving means in the machine table plate comprises bores formed in the table plate.

10. A spark erosion machine according to claim 8 wherein said support means are selectively raisable, lowerable and rotatable for removing the machine table plate.

11. A spark erosion machine according to claim 9 wherein said support means comprises support struts of an automatically operating, raisable, lowerable and rotatable table plate changing mechanism.

12. A spark erosion machine according to claim 2 wherein the machine table plate is constructed to overhang the machine table in the front and on the sides thereof.

* * * * *

UNITED STATES PATENT AND TRADEMARK OFFICE
CERTIFICATE OF CORRECTION

PATENT NO. : 4,749,838
DATED : June 7, 1988
INVENTOR(S) : Attilio Lodetti, et al.

It is certified that error appears in the above-identified patent and that said Letters Patent is hereby corrected as shown below:

In Column 1, line 25, "crosssection" should be
--cross-section--.

In Column 2, line 49, "verticallY" should be
--vertically--.

In Column 5, line 30, "vertically" should be
--vertical--.

In Column 6, line 37, "palte" should be
--plate--.

Signed and Sealed this

Twenty-fifth Day of April, 1989

Attest:

DONALD J. QUIGG

Attesting Officer

Commissioner of Patents and Trademarks